June 16, 1936.  W. H. PRATT  2,044,542

ELECTRICAL METER

Filed Sept. 7, 1934

Inventor:
William H. Pratt,
by Harry E. Dunham
His Attorney

Patented June 16, 1936

2,044,542

UNITED STATES PATENT OFFICE 2,044,542

ELECTRICAL METER

William H. Pratt, Lynn, Mass., assignor to General Electric Company, a corporation of New York Application September 7, 1934, Serial No. 743,106

14 Claims. (Cl. 171—34)

My invention relates to electrical meters and concerns particularly devices for integrating with respect to time the product or the quotient of two variable electrical quantities or two quantities which may be represented by electrical currents or voltages.

The principal object of my invention is the provision of a simple, easily constructed volt ampere hour meter.

Another object is the provision of an admittance-hour or impedance-hour meter.

Other and further objects and advantages will become apparent as the description proceeds.

In accordance with my invention in its preferred form, I provide an ampere-hour meter with a brake or device for producing a restraining torque which varies inversely with voltage. Consequently, the speed of the meter increases both with increasing current and with increasing voltage and decreases with decreasing values of current and voltage so that the number of revolutions made by the meter may be registered to provide a record of volt-ampere hours.

Figure 1:
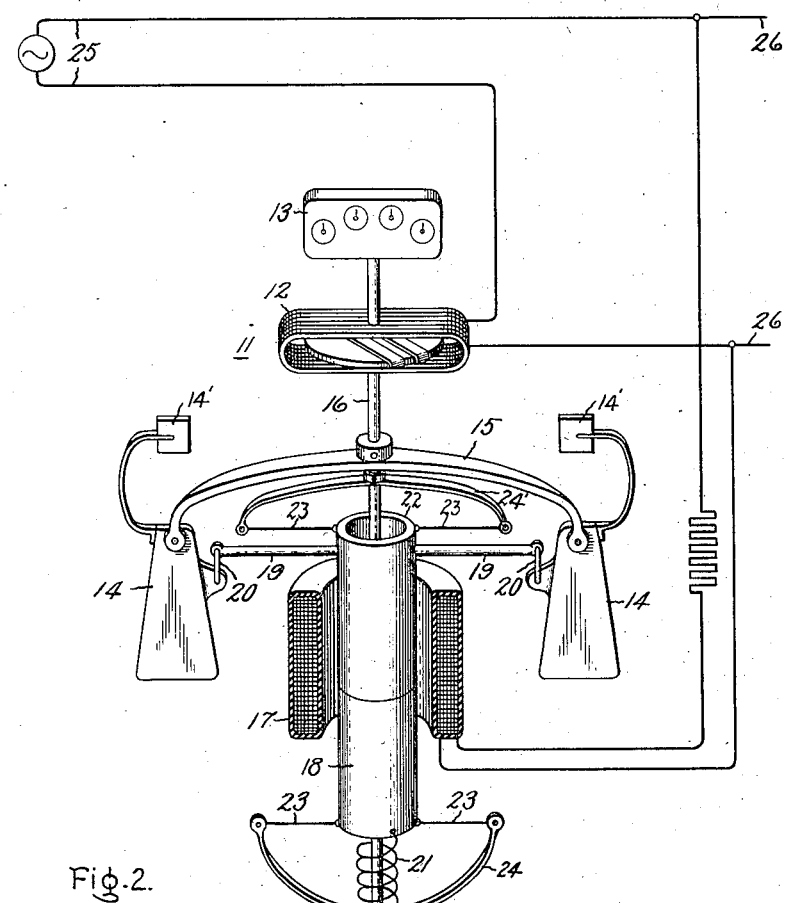
Figure 2:
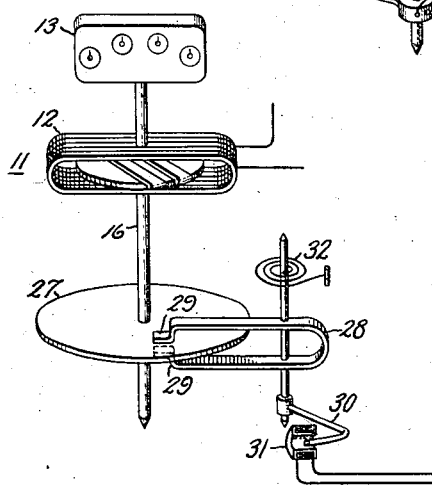
Figure 3:
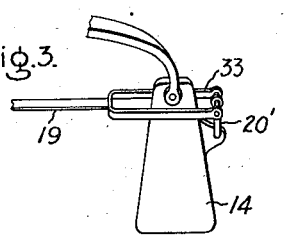

The features of my invention which I believe to be novel and patentable will be pointed out in the claims appended hereto. A better understanding of my invention itself, however, may be obtained by referring to the following description taken in connection with the accompanying drawing in which Fig. 1 is a schematic diagram representing one embodiment of my invention in which the electrical circuits are employed; Fig. 2 represents another embodiment of my invention; and Fig. 3 is a partial view of a modification of the embodiment of Fig. 1.

Referring now more in detail to the drawing in which like reference characters are utilized to designate like parts throughout, I utilize an induction motor 11 having current windings 12 to form an ampere-hour unit of a type well known in the art, and provide the motor 11 with a brake which provides a restraining torque that decreases with increases in voltage. In order to record the number of revolutions made by the motor 11, a register 13 is provided.

In Fig. 1, the variable torque brake consists of damping vanes 14 pivotally mounted on a bow 15 carried by the shaft 16, a solenoid voltage winding 17 and an armature 18 cooperating with the solenoid and mechanically connected with the vanes 14 through arms 19 and links 20 to cause the vanes 14 to be drawn inward as the voltage increases and armature 18 is drawn upward, and to swing outward as the voltage decreases and armature 18 is permitted to drop.

The vanes 14 may be provided with counterweights 14' if desired. A spring 21 is provided to furnish the necessary control and to make the relative positions of solenoid 17 and armature 18 vary in accordance with voltage. The armature 18 may be composed of iron or other ferromagnetic material in hollow cylindrical form to permit it to be mounted around a shaft 16. If desired, the armature 18 may be provided with an extension 22 of aluminum or other non magnetic material to facilitate attachment of the arms 19. In order to overcome friction and yet maintain the armature 18 coaxial with the solenoid 17 and the shaft 16, flexible ligaments 23 may be provided for attaching the upper end of armature extension 22 to the bow 24' and the lower end of armature 18 to a second bow 24 carried by shaft 16. Preferably the bows 24 and 24' are made flexible.

Although for clarity in the drawing, I have shown the damping member carrying only two vanes 14, it will be understood that any number of vanes may be employed, preferably evenly spaced around the shaft 16. As is well understood, the vanes 14 act as fans which offer a certain resistance to the rotation of the shaft 16 which resistance increases with speed, thereby making the speed of the shaft 16 for a given voltage and position of the vanes 14 dependent upon the torque provided by the induction motor 11, which, in turn, depends upon the magnitude of the current flowing in the winding 12. It will also be apparent that, if the vanes 14 are drawn inward in response to increased voltage, the air resistance will be decreased and the speed of the shaft 16 will be increased according to the magnitude of the voltage.

It will be understood that the linkage consisting of the arms 19, the links 20 and the pivotal points of the vanes 14 are so dimensioned and positioned in relationship between the position of the armature 18 and the voltage applied to solenoid 17 that the torque produced by the air resistance of the vanes 14 varies inversely with the voltage acting on the solenoid 17. Consequently, the speed of the shaft 16 is proportional to the product of the currents in windings 12 and 17 or to the product of the current in winding 12 and the voltage in winding 17 so that, if the winding 12 is connected in series with a source of current 25, a load is connected to the conductors 26, and the winding 17 is connected between the conductors 26, the speed of the shaft 16 will be proportional to the product of the current and the voltage supplied by source 25 and the register 13 will provide a record of the volt ampere hours drawn from the current source 25.

My invention is of course not limited to integrating volt ampere hours since any two quantities which can be made to vary with the magnitudes of currents or voltages may have their products integrated by connecting the current or voltage produced in response to variations of one quantity to the winding 12 and the current or voltage produced in response to variations of the other quantity to winding 17.

Although I have illustrated in Fig. 1 the use of an air resistance damping device to produce the restraining torque, it will be understood that my invention is not limited thereto and that any form of brake may be employed in which the restraining torque may be varied inversely with one of the quantities to be multiplied. For example, in Fig. 2, I have shown an arrangement in which the restraining torque is provided by the reaction between a damping disc 27 and movable permanent magnet 28. The radial distance of the pole pieces 29 of the braking magnet 28 is made to vary in any suitable manner in response to variations in one of the quantities to be integrated. For example, the magnet 28 may be pivotally mounted and mechanically connected to the plunger 30 cooperating with the solenoid 31. As the voltage increases the radius of action of the pole pieces 29 decreases and the speed of the shaft 16 increases so that a similar operation results to that described in connection with Fig. 1.

Figs. 1 and 2 illustrate the use of my invention in devices for integrating the product of two variable direct quantities, such as the product of volts and amperes, or volt-amperes, but my invention may readily be applied to the integration of a ratio of two variable quantities, or the product of one quantity and the reciprocal of another. By the term "product", I mean to include the case where one of the quantities is a reciprocal of a directly measurable quantity. For example, if the arms 19 are provided with forked extensions 33 and connected to the vanes 14 on their outer sides as indicated in Fig. 3 instead of their inner sides as shown in Fig. 1, the vanes 14 will be pushed outward instead of being drawn inward as the voltage at winding 17 increases. By proper dimensioning of the elements of the damping or brake mechanism, the braking is made directly proportional to the applied voltage and the meter is caused to integrate the ratio of current to voltage to register admittance-hours of a circuit. Similarly, by interchanging current and voltage windings, impedance-hours may be registered.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A volt ampere-hour meter comprising in combination a register, an induction disc motor driving said register and having a current winding, a variable radius rotatable air resistance damping member mechanically connected to said induction disc motor, a solenoid voltage winding and an armature cooperating therewith and connected mechanically to said damping member to vary the radius and restraining torque thereof inversely in response to variations in voltage whereby the speed of said induction motor varies as a product of current and voltage.

2. A volt ampere-hour meter comprising in combination a register, an induction motor driving said register and having a current winding, a rotatable damping member mechanically connected to said induction motor and having a plurality of radial vanes pivotally mounted to permit swinging toward or from the axis of rotation, a solenoid voltage winding and an armature cooperating therewith and connected mechanically to said damping vanes to vary their distance from their axis of rotation and the restraining torque of the damping member inversely in response to variations in voltage, whereby the speed of said induction motor varies as a product of current and voltage.

3. A volt ampere-hour meter comprising in combination, a register, an induction motor driving said register and having a current winding, a rotatable damping member mechanically connected to said induction motor and having a plurality of radial vanes pivotally mounted to permit swinging toward or from the axis of rotation, means for varying the distance of said damping vanes from the axis of rotation and the restraining torque of the damping member inversely in response to variations in voltage, whereby the speed of said induction motor varies as a product of current and voltage.

4. In combination with a source of electrical current, a volt ampere-hour meter comprising a register, an induction motor driving said register and a current winding connected in series with said source of current, a variable radius rotatable air resistance damping member mechanically connected to said induction motor, a solenoid voltage winding connected across said source of electrical current and an armature cooperating therewith and connected mechanically to said damping member to vary the radius and restraining torque thereof inversely in response to variations in voltage, whereby the speed of said induction motor varies as the product of current and voltage of said source of electrical current.

5. A volt ampere-hour meter comprising in combination a register, an induction motor driving said register and having a current winding, a damping mechanism mechanically connected to said induction motor, and means for varying the damping effect inversely in response to variations in voltage, whereby the speed of said induction motor varies as the product of current and voltage.

6. A volt ampere-hour meter comprising in combination a register, an induction motor driving said register and having a current winding, a rotatable damping member mechanically connected to said induction motor, and means for varying the radius of action of said damping member and the restraining torque thereof inversely in response to variations in voltage, whereby the speed of said induction motor varies as the product of current and voltage.

7. In combination with a source of electrical current, a volt ampere-hour meter comprising a register, an induction motor driving said register and having a current winding connected in series with said current source, and a brake mechanism mechanically connected to said induction motor having a voltage winding connected across said current source and controlling said brake mechanism to vary the braking effect thereof inversely in response to variations in voltage, whereby the speed of said induction motor varies as the product of current and voltage.

8. In a volt ampere-hour meter, the combination of an induction motor having a current winding, and a variable strength braking mechanism having a voltage winding controlling its braking effect to vary inversely in response to variations in voltage, whereby the speed of said induction motor varies as the product of current and voltage.

9. A device for integrating with respect to time the product of two variable quantities which comprises in combination, a register, a motor driving said register and having a winding adapted to have the current therein vary in response to variations of one of said quantities, a variable strength braking mechanism having a winding adapted to have the current therein vary in response to variations in the other of said quantities and controlling the braking effect thereof to vary inversely in response to variations in current in said latter winding, whereby the speed of said motor varies as the product of said quantities.

10. A device for integrating with respect to time the ratio of two variable quantities which comprises in combination, a register, a motor driving said register and having a winding adapted to have a current therein vary in response to variations of one of said quantities, a damping unit having a rotatable member connected to said motor and having a winding adapted to have the current therein vary in response to variations in the other of said quantities and means controlled by said latter winding for increasing the radius of action of said damping member in response to increase in current in said latter winding, whereby the speed of said motor varies as the ratio of said quantities.

11. A device for integrating with respect to time a function of two variable quantities which comprises in combination, a register, a motor driving said register and having a winding adapted to have the current therein vary in response to variations of one of said quantities, a damping unit having a rotatable member connected to said motor and having a winding adapted to have the current therein vary as a function of variations in the other of said quantities and adapted to vary the radius of action of said damping unit as a function of the current in said latter winding, whereby the speed of said motor varies as a function of both said quantities.

12. An integrating meter comprising in combination, a register, an induction disc motor driving said register having a current-conducting winding, a damping unit having a rotatable member connected to said induction motor and having a current-conducting winding, means for varying the radius of action of said damping member controlled by said latter current-conducting winding, whereby the speed of said induction motor varies as a function of the currents in said windings.

13. A device for integrating with respect to time the ratio of two variable quantities which comprises in combination, a register, a motor driving said register and having a winding adapted to have a current therein varying in response to variations of one of said quantities, a variable radius rotatable air-resistance damping member mechanically connected to said motor, a solenoid winding adapted to have the current therein vary in response to variations in the other of said quantities, and an armature cooperating with said solenoid winding and connected mechanically to said damping member to increase the radius and restraining torque thereof in response to increase in current in said solenoid winding, whereby the speed of said motor varies as the ratio of said quantities.

14. A device for integrating with respect to time a function of two variable quantities which comprises in combination, a register, a motor driving said register and having a winding adapted to have a current therein varying in response to variations of one of said quantities, a variable radius rotatable air-resistance damping member mechanically connected to said motor, a solenoid winding adapted to have the current therein vary in response to variations in the other of said quantities, and an armature cooperating with said solenoid winding and connected mechanically to said damping member to vary the radius and restraining torque thereof in response to variations in current in said solenoid winding, whereby the speed of said motor varies as a function of said quantities.

WILLIAM H. PRATT.